UNITED STATES PATENT OFFICE.

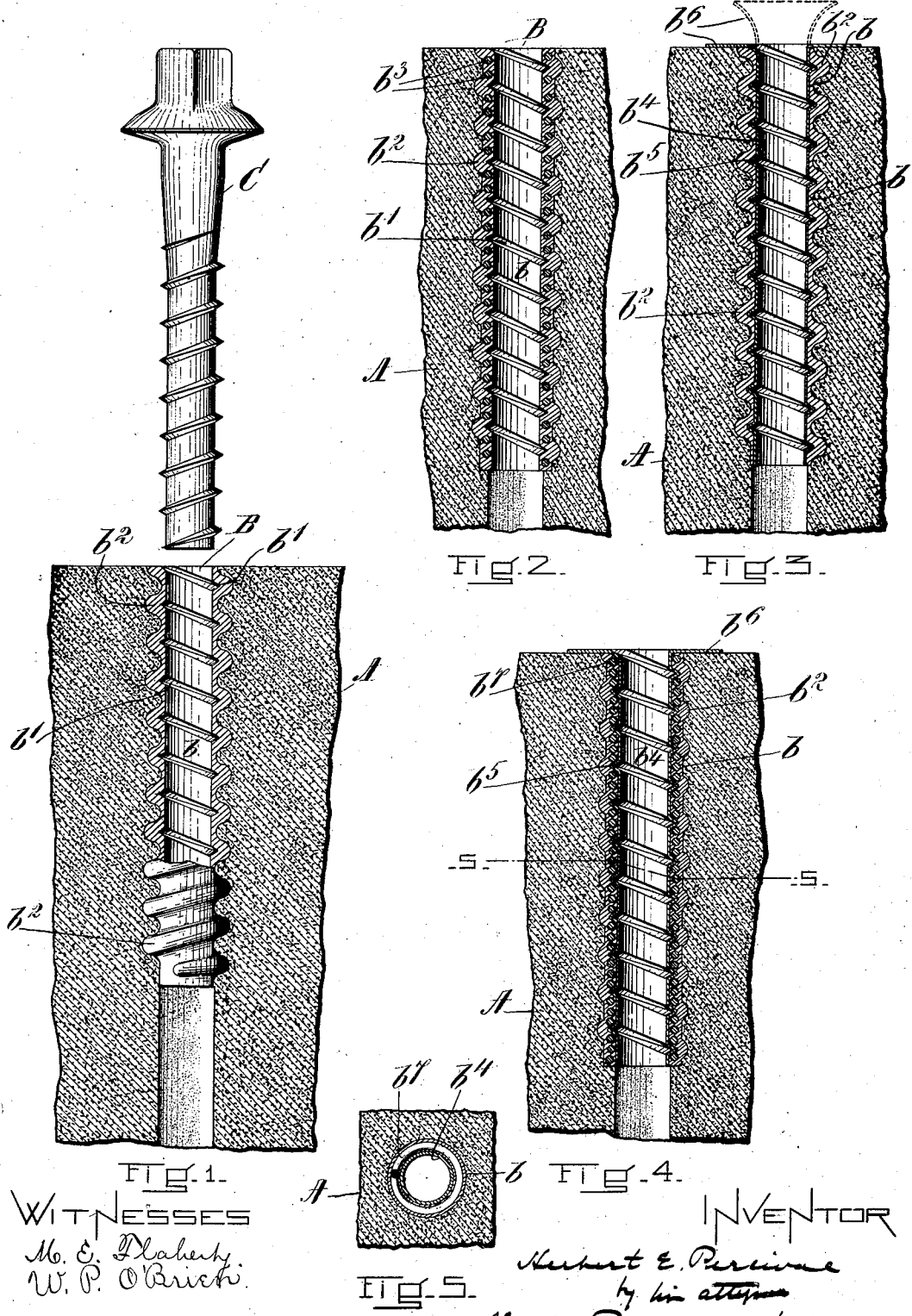

HERBERT E. PERCIVAL, OF HOUSTON, TEXAS, ASSIGNOR OF ONE-HALF TO BREWER W. KEY, OF WOODWARD, OKLAHOMA.

FASTENING.

938,073.  Specification of Letters Patent.  Patented Oct. 26, 1909.

Application filed October 15, 1908.  Serial No. 457,768.

*To all whom it may concern:*

Be it known that I, HERBERT E. PERCIVAL, of Houston, in the county of Harris and State of Texas, a citizen of the United States, have invented a new and useful Improvement in Fastenings, of which the following is a full, clear, and exact description, reference being had to the accompanying drawings, forming a part of this specification, in explaining its nature.

My invention relates to an improvement in fastenings and to that type of fastening comprising a threaded member and a socket into which the threaded member is adapted to screw to become seated therein and one also which is especially adapted for fastening a rail to a tie made of cement or other plastic material in which the socket is made or formed.

The special object of my invention is to provide a fastening of the above character in which the threaded member will not shake loose or become disengaged from the socket except in consequence of some positive action for the purpose of removing the threaded member, and a fastening, also, which will be commercially practicable, meaning a fastening which can be made at comparatively low cost. This latter consideration especially is one that I desire to meet by my invention, for while many fastenings hitherto made have been practicable in the sense that the threaded member when seated will not become loose, yet the cost of making such a socket is so great that it lacks utility from a commercial standpoint.

My invention can best be seen and understood by reference to the drawings in which—

Figure 1 shows in vertical cross section a socket embodying my invention embedded in a cement or plastic body, there being shown in combination with the socket a threaded member or screw spike in position ready to enter the socket. Fig. 2 shows in cross vertical section a slight modification in the construction of the socket shown in Fig. 1. Fig. 3 shows in vertical cross section a further form of socket embodying my invention. Fig. 4 shows in vertical cross section a slight modification of the socket shown in Fig. 3, and Fig. 5 is a cross section on the line 5—5 of Fig. 4.

In the drawings:—A represents a cement or plastic body. Embedded therein is a socket B while C is a threaded member or screw spike adapted to enter and become seated within the socket.

The socket B comprises a tubular body $b$ of some relatively soft metal, such as a combination of Babbitt metal and lead. On the inside this body is provided with a spiral groove $b^1$ into which is adapted to fit and run the threads on the member C as this member is screwed into the socket. On the outside of the body of the socket, running around the same, is a spiral rib $b^2$. This rib follows the line of the groove cut on the inside of the body of the socket reinforcing it at the point of the groove. The socket so formed is molded into the cement or plastic body at the time it is formed when the socket becomes permanently set therein. The advantage of this construction is that little metal need be used for making the main body of the socket; in other words, the body of the socket may be quite thin, just enough metal being employed to provide a facing or lining to the cement or plastic material in which the socket is set. By providing the body of the socket on the outside with a spiral rib in line with and adjacent to the groove cut on the inside of the body of the socket the body at the point of the groove becomes so strengthened or reinforced as to provide a proper setting, as it were, for the thread of the threaded member and also furnishes a sufficiency of metal between the thread and the plastic material to prevent the thread cutting through the wall of the socket made as it is relatively thin. I prefer, also, that that portion of the socket comprising the spiral rib shall be made thicker or heavier in metal than that portion of the socket between the lines of the rib in order that a sufficiency of metal may be provided to form a yielding cushion and prevent the thread of the threaded member as it is screwed into the socket from crushing the cement or plastic material as it otherwise might do. This is especially so because in practice the groove formed on the inside of the body of the socket is made slightly less in depth than the height of the thread on the shank of the threaded member in order that the thread, when the threaded member is screwed into the socket, may cut its way in part for the purpose of securing an absolutely tight fit. Another advantage of the spiral rib on the body of the socket resides in the fact that it provides means by which the socket becomes firmly set into the cement or plastic body in such manner that it cannot possibly become drawn out and this moreover without the necessity of providing any auxiliary means of retention.

In Fig. 2 there is shown substantially the same kind of socket as shown in Fig. 1, excepting, however, that the body of the socket between the lines of its spiral rib is reinforced by embedding therein a spiral reinforcement of hard metal, the same preferably comprising one or more coils of wire $b^3$.

In Fig. 3 there is shown a socket substantially the same as the socket shown in Fig. 1 excepting that the body $b$ of the socket, made of some relatively soft material, is provided with a sheet lining or inside facing $b^4$ of some harder metal, the same being preferably a lining made either of sheet brass, white metal, galvanized iron, copper or some other hard, non-corrosive material. In this lining there is formed a spiral groove $b^5$ for receiving the thread of the threaded member or screw spike as it is turned into the socket. The advantage of this construction is that by making the lining of the socket or part directly adjacent to the threaded member of relatively hard metal all the advantages of a hard metal socket are obtained. In other words, the hard metal lining acts to better hold the threaded member when once screwed into the socket than would a lining of a softer metal. The reason for this is that the hard metal lining, though yielding sufficiently to permit the threaded member or screw entering the socket, will act to resist the thread on the screw on which account considerable power need be exercised to screw the threaded member into the socket, but once turned in it will remain set. The lining of the socket being hard, the threads of the threaded member will not cut into it, the tendency of the thread in case of too much resistance on the part of the lining of the socket being to force the lining outwardly into the soft body of the socket which forms a cushion between the lining and the cement or plastic body preventing it from being crushed. A further advantage of this construction resides in the fact that in a socket of this kind the threaded member or screw spike may be turned in or out many times and the socket remain in proper condition for properly retaining the screw, the reason being that the threaded member cannot cut into the socket and the wear will be very slight. A further advantage of providing a hard metal core or lining for the socket resides in the fact that this lining may be extended to lap over the end of the cement or plastic body around the hole or opening in it. Such a construction is shown in Fig. 3 where the lining $b^4$ of the socket is shown having an extension $b^6$ that laps over the end of the socket and projects upon the surface of the cement or plastic body in which the socket is set in the manner of a flange. A convenient method of properly seating this extension or flange around the end of the socket is to form the lining of the socket with an end extension substantially as shown in the dotted lines of Fig. 3, this being knocked down after the socket has been set. Such an extension provides a non-corrosive facing to the end of the socket, prevents water or moisture from entering it, and also prevents the cement or plastic material in which the socket is set from deteriorating or wearing away around the end of the socket.

In Fig. 4 there is shown a form of socket substantially like the socket shown in Fig. 3 excepting that the body $b$ of the socket is made of soft metal which backs the hard metal lining or core $b^4$ and is reinforced by one or more coils of wire $b^7$, three coils being shown. These coils are so arranged as to lie between the lines of the spiral rib on the body of the socket, which rib as before described follows the spiral groove $b^5$ formed in the lining of the socket. These wires not only reinforce and give additional strength to the soft metal forming the body of the socket, but being arranged, as they preferably are, in positions just adjacent to the spiral groove $b^5$ formed in the lining of the socket, they assist in supporting the grooved portion of the lining to resist the thread of the screw. They also cause a more even displacement of the grooved portion of the lining in case it is displaced laterally into the soft metal backing of the socket by undue pressure of the thread of the screw and also provide wearing surfaces of hard metal for the thread of the screw in case the thread should in time wear through the hard metal lining.

Having thus fully described my invention, I claim and desire to secure by Letters Patent of the United States:—

1. A fastening of the character specified, the same comprising a threaded member and a socket adapted to be set into a plastic base and into which socket said threaded member is adapted to screw, said socket having a thin body of relatively hard metal having on the inside thereof a groove for receiving the thread of said threaded member and on the outside a spiral rib of metal thickening said body of the socket at the point of the groove therein for reinforcing said body and providing a metal cushion between said socket at the point of said groove and the base of plastic material into which the socket may be set.

2. A fastening of the character specified, the same comprising a threaded member and a socket adapted to be set into a base of plastic material and into which socket said threaded member is adapted to screw, the interior of which socket is made of relatively hard metal having a backing of softer metal.

3. A fastening of the character specified, the same comprising a threaded member and a metal socket into which said threaded member is adapted to screw to become seated therein, said socket having a spiral rib reinforcing the body thereof and a hard metal spiral reinforcement set into the body of said socket and interposed between the lines of its said spiral rib.

4. A fastening of the character specified, the same comprising a threaded member and a socket adapted to be set into a base of plastic material and into which socket said threaded member is adapted to screw and become seated therein, said socket having a lining of relatively thin hard metal reinforced by a backing of softer metal.

5. A fastening of the character specified, the same comprising a threaded member and a socket adapted to be set into a base of plastic material and into which socket said threaded member is adapted to screw to become seated therein, said socket having a lining of thin relatively hard metal and a backing of softer metal adapted to form a cushion between the lining and the plastic material into which the socket is set.

6. A fastening of the character specified, the same comprising a threaded member and a socket adapted to be set into a base of plastic material and into which socket said threaded member is adapted to screw to become seated therein, said socket having on the inside a lining of relatively thin hard metal spirally grooved to receive said threaded member and on the outside a body of softer metal comprising in part a spiral rib reinforcing the body of said socket at the point of the groove on the inside thereof.

7. A fastening of the character specified, the same comprising a threaded member and a socket adapted to be set into a base of plastic material and into which socket said threaded member is adapted to screw to become seated therein, said socket having on the inside thereof a lining of relatively thin hard metal having formed therein a spiral groove for receiving the thread of said threaded member and on the outside a body of softer metal and in said body of softer metal a hard metal spiral reinforcement placed adjacent to and backing the groove formed in said lining.

8. A fastening of the character specified, the same comprising a threaded member and a socket adapted to be set into a base of plastic material and into which socket said threaded member is adapted to screw to become seated therein, said socket having a metal lining extending from the end of said socket to lap over onto the surface of the plastic base into which the socket is set for sealing the end of said socket.

HERBERT E. PERCIVAL.

In the presence of—
M. E. FLAHERTY,
JOHN E. R. HAYES.